United States Patent [19]

Hasenwinkle

[11] Patent Number: 4,690,188

[45] Date of Patent: Sep. 1, 1987

[54] VARIABLE CURVE LINEBAR WITH SKEWABLE SAWS

[75] Inventor: Earl D. Hasenwinkle, Puyallup, Wash.

[73] Assignee: Weyerhaeuser Company, Tacoma, Wash.

[21] Appl. No.: 923,776

[22] Filed: Oct. 27, 1986

[51] Int. Cl.⁴ .................. B27B 1/00; B27B 25/02
[52] U.S. Cl. .................... 144/378; 83/446; 83/441.1; 144/242 F; 144/253 H
[58] Field of Search .......... 144/39, 41, 145 R, 242 R, 144/242 E, 253 R, 253 G, 253.E, 357, 376, 377, 378; 83/444, 444.1, 446, 449

[56] References Cited

U.S. PATENT DOCUMENTS

| | | |
|---|---|---|
| 259,661 | 6/1882 | Bowker . |
| 1,263,443 | 4/1918 | Lien . |
| 2,703,120 | 3/1955 | Walker ............................. 144/242 E |
| 3,665,984 | 5/1972 | Ackerfeldt ....................... 143/157 R |
| 3,685,556 | 8/1972 | VanSickle ........................ 144/242 E |
| 4,144,782 | 3/1979 | Lindstrom ......................... 83/102.1 |
| 4,219,056 | 8/1980 | Lindstrom ............................ 144/3 P |
| 4,373,563 | 2/1983 | Kenyon ................................ 144/357 |
| 4,416,312 | 11/1983 | Ostberg ................................. 144/39 |
| 4,485,861 | 12/1984 | Nilsson et al. ......................... 144/39 |
| 4,548,247 | 10/1985 | Eklund ................................. 144/357 |
| 4,572,256 | 2/1986 | Rautino ................................. 144/39 |
| 4,599,929 | 7/1986 | Dutina ................................. 144/39 |
| 4,633,924 | 1/1987 | Hasenwinkle et al. ........... 144/242 E |

FOREIGN PATENT DOCUMENTS 49-7557  2/1974  Japan .
33098  12/1908  Sweden .
306415  11/1968  Sweden .
545  of 1852  United Kingdom .

Primary Examiner—W. D. Bray

[57] ABSTRACT

The present invention is the combination of a linebar and saw assembly for sawing cants or logs having various amounts of sweep in order to maximize the yield. The linebar is conformable between a straight line and a line which approximates an arc of a circle. Both ends of the linebar are positioned relative to the saw so that one end is essentially adjacent to the center of the saw. Both ends of the linebar always remain on the line defined by the linebar when it is in straight line position. A tangent to the end of the linebar adjacent to the saw is always parallel to the plane defined by the saw. The saw is skewable about the point of intersection of the end of the linebar with a line drawn from the centerline of and normal to the plane of the saw. A mechanism for bending the linebar and skewing the saw completes the invention. Using this invention the linebar can be configured into an arc which approximates the sweep curvature of a cant or log being sawn. As the linebar is bent the saw is skewed to maintain parallelism with the line of tangency. The invention is particularly well adapted for use in sawmills where space is limited and where there may not be room to use a variable curve linebar which is deflected only at one end. Improvements of lumber recovery to about 20% are achieved by sawing around the curve as compared with processing similar sweepy cants by straight line sawing.

21 Claims, 16 Drawing Figures

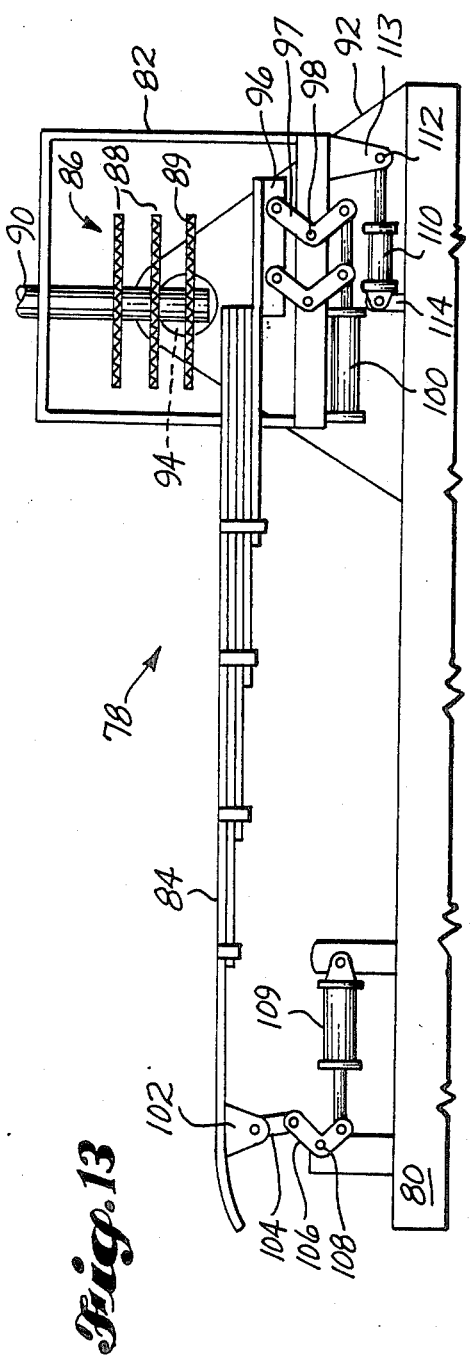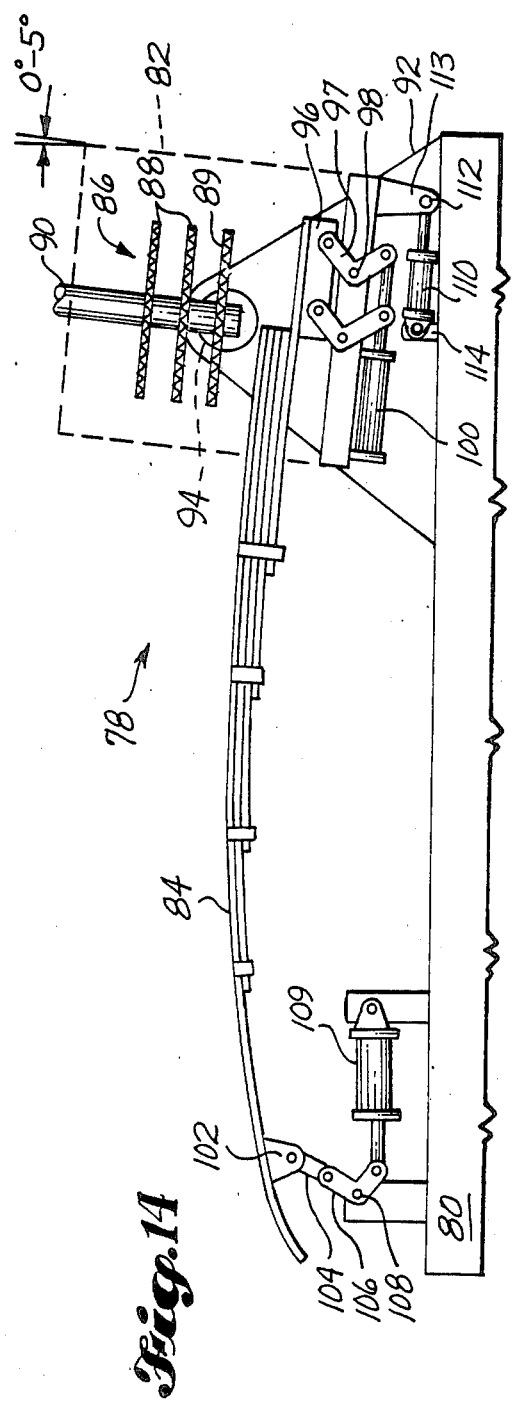

VARIABLE CURVE LINEBAR WITH SKEWABLE SAWS

BACKGROUND OF THE INVENTION

The present invention comprises a linebar and saw assembly for sawing logs or cants having varying amounts of sweep from piece to piece. It is especially useful for increasing the recovery of saleable lumber from sweepy cants or logs.

Within a few more years, the last of the old growth timber available for harvesting in the United States will have been cut. Most of the sawmills which formerly depended on large old growth logs have already had to convert the equipment in their mills to that which is suitable for handling much smaller logs at high throughput volumes. One common characteristic of second growth timber is that the logs usually have varying amounts of sweep or curvature. The presence of sweep results in yields which are significantly lower than those which are attainable from straight logs. This is because much of the curved portion must be machined off in order to produce cants or lumber having the usual configuration of a rectangular parallelepiped.

Most small log sawmills orient the log prior to the primary breakdown saw so that the greatest curvature is either up or down (horns up or horns down) rather than side to side. These opening cuts may be either made by saws or by chippers which reduce the sides of the log to wood chips suitable for pulping. The result is a cant having parallel faces on two sides. As noted earlier, cants sawn in this fashion tend to have appreciable sweep. Sweep is here defined to mean the curvature on the concave edge of the cant when the cant is placed on one of its flat faces. While occasional instances of extreme sweep occur, in most cases sweep is rarely greater than about 100 mm in a cant approximately 5 m long (about 4 in. in 16 ft.). Most typically, it will be about half of this amount.

Man has had to attempt to cope with geometric irregularities in logs ever since he began to utilize trees. Thus, it is not unexpected that the prior art shows previous attempts to deal with sweepy cants and to devise schemes for improving the yield from cants of this type.

As general background to the present invention, reference can be made to U.S. Pat. Nos. 259,661 to Bowker and 1,263,443 to Lien. Both of these inventors devised schemes for sawing wooden barrel hoops along a path that was precisely parallel to the outside surface of the log. This was deemed necessary in order to reduce the presence of cross grain which would reduce the strength of the hoop. Somewhat more pertinent is Great Britain Pat. No. 545 of 1852. In this sawing device, a tree was placed on a carriage which could be moved in a circular arc with respect to a saw. The purpose here appears to be to cut complex curved and/or angled ships timbers. However, it appears inherent in the invention that cuts could be made parallel to the surface of a curved log.

Japanese Pat. No. 49-7557 shows a device used for "sawing around the curve" of a cant which contains sweep. The cant is first sawn to produce one good edge parallel to the original surface. After this point, additional boards can be taken off parallel to this surface by manually steering the cant as it emerges from the saw.

Swedish Pat. No. 33,098 is a sawing device having feed rolls which can be canted so that the axes lie at an angle and intersect at a point corresponding to the arc of a curve along which a cut is to be made. U.S. Pat. No. b 3,685,556 to VanSickle takes a somewhat different approach. This inventor shows a device for use with a shop band saw for cutting predetermined contoured pieces for straight stock to make; e.g., Christmas tree stands. More conventional approaches are described in U.S. Pat. No. 3,665,984 to Ackerfeldt, U.S. Pat. No. 4,416,312 to Ostberg and Swedish Pat. No. 306,415. These, in general, deal with positioners for optimizing yields from curved cants by straight line sawing. The patent Ackerfeldt is valuable for the background it gives to this type of approach.

While it has been noted that increased yields can be obtained by "sawing around the curve", until very recently nothing has been done to make this a practical approach in a modern, high-speed sawmill. The closest examples can be found in U.S. Pat. Nos. 4,144,782 and 4,219,056 to Lindstrom and U.S. Pat. No. 4,373,563 to Kenyon. The earlier of the two Lindstrom patents is of particular interest. In the device described, a log is fed into what is preferably a single band saw along a path which follows the curvature of the log. The log lies on a roll case with two pairs of opposing vertical guide rollers upstream from the saw. These guide rollers embrace the cant as it is fed into the saw. They are mounted on frames transversely displaceable to the path of the log so that the log is directed along a curve to which the saw blade is tangent. Lindstrom further notes that the bowed boards resulting from around-the-curve sawing will generally flatten out when they are kiln dried. Kenyon shows a somewhat similar system. However, the cant is oriented by lateral pressure applied only to one side of the cant by a roller located upstream from the point of sawing.

To the present inventor's knowledge, the devices taught by Lindstrom and Kenyon have had limited commercial application although their use has not become widespread. This may possibly be because they are of limited use in a high-speed sawmill which may typically run 10-20 cants per minute through a gang saw.

In two earlier applications commonly assigned with the present one and in which the present applicant is a co-inventor, the applicants have successfully dealt with the problem of maximizing yield from cants having significant amounts of sweep. One method utilizes apparatus disclosed in Ser. No. 793,925, filed Nov. 1, 1985, which is hereby incorporated by reference. This application shows a linebar which can be bent by the sawyer to varying degrees of curvature which will correspond to the curvature of the particular cant being sawn. At a point opposite the saw arbor a tangent to the linebar always lies parallel to the plane of the saws. A second application, Ser. No. 814,137, filed Dec. 27, 1985, which is also herein incorporated by reference, discloses the use of a linebar having a fixed curvature. This curvature is equivalent to the average sweep found in a large sample of cants being processed by the sawmill. As is the case with the other linebar, a tangent to the linebar at a point opposite the projected axis of the saw arbor lies parallel to the plane of the saws.

Both of the above linebars have had a positive effect upon recovery in mills where they can be incorporated. Unfortunately, sometimes the first of these devices can not be used due to physical limitations found within sawmills. A typical small log sawmill might have a gang saw linebar 7.3 m (24 ft) in length. For a cant having about 50 mm sweep in 4.9 m length (2 in in 16 ft) the infeed end of the linebar must be deflected about 460 mm (18 in) from the tangent line. Space is not always available in a sawmill to accommodate a linebar deflection of this magnitude. The second device described above gives a major improvement over straight line sawing but cannot take full advantage of the possible yield increase since it is configured for a cant of "average" sweep.

The present invention is designed to overcome the problems of space limitations which would prevent one of the above linebars from being utilized. In addition, it has other advantages which will now be described.

SUMMARY OF THE INVENTION

The present invention comprises a linebar and saw assembly for sawing cants or logs which have varying amounts of sweep from piece to piece. Sweep is here defined as longitudinal curvature in a cant or log. In a generally rectangular piece this curvature is normally found along the narrower face. The invention also comprises a method for sawing logs or cants of this type for increasing lumber recovery.

One element of the invention is at least one saw, which may be either a bandsaw or circular saw. most commonly the saw will be a gang saw having a plurality of circular saws on a common arbor. A second element is an elongated flexible linebar which is conformable at the will of an operator between a straight line and a line approximating an arc of a circle. This linebar is positioned relative to the saw so that one end is adjacent to the center of the saw. "Center" is here defined as that centerline of the saw lying in the plane of the saw and normal to a projection of the longest dimension of the linebar. Both ends of the linebar always lie on the line defined by the linebar when it is in straight line position. Bending forces are applied so that only the central portion of the linebar is deflected without significant change in the location of either end. This is in contrast to the variable curve linebar described in application, Ser. No. 814,137, in which one end of the linebar is deflected. A tangent drawn along the end of the linebar which is adjacent to the saw is always essentially parallel to the plane defined by that saw. The saw itself is skewable at the point of intersection of the adjacent end of the linebar with a line drawn normal to the plane of the saw from the previously defined centerline. The other elements of the apparatus include a means of bending the linebar for controlling its curvature and a skewing means for the saw.

In use, the linebar can be configured into an arc which approximates the sweep curvature of a cant or log being sawn and the saw can be skewed to maintain parallelism with the line of tangency at the adjacent end of the linebar. Using this procedure a log or cant can be guided into the saw along a path approximating its radius of curvature so that waste is minimized. Recovery of saleable lumber can be as much as 20 percent that is obtained using straight line sawing.

The saw or saws can be skewed in various ways. Either the entire saw assembly, including frame, arbor, and/or drive can be skewed about the point of rotation. Alternatively, in some types of saw construction it is possible to skew only the saw blades using opposed leading edge and trailing edge saw guides to control the position.

While this is not essential, it is desirable to be able to control the distance between the linebar and saw. In the case of a gang saw, the distance between the linebar and the first or "zero" saw would be controlled. This enables a slab of varying thickness to be removed to further minimize waste of saleable lumber.

It is an object of the present invention to provide a linebar and saw combination in which the linebar has the capability of being adjusted to varying degrees of curvature and the saw can be skewed to maintain a tangent relationship with the end of the linebar.

It is another object to provide a saw in combination with a linebar whose curvature can be varied to enable a sweepy cant to be sawed around the curve in order to increase recovery and lumber yield.

It is a further object to provide a variable curve linebar and saw combination which can be installed within the same space occupied by more conventional equipment.

It is still another object to provide a variable curve linebar which can be translated toward or away from the saw to control offset.

These and many other objects will become readily apparent to those skilled in the art upon reading the following detailed description taken in conjunction with the drawings.

BRIEF DESCRIPTION OF THE DRAWINGS

FIG. 13 illustrates a vertical arbor gang saw and shows a method by which a linebar can be bent into a curved configuration while the saws are simultaneously skewed.

FIG. 14 is similar to FIG. 13 but shows the linebar in curved configuration.

DESCRIPTION OF THE PREFERRED EMBODIMENTS

Figure 1:
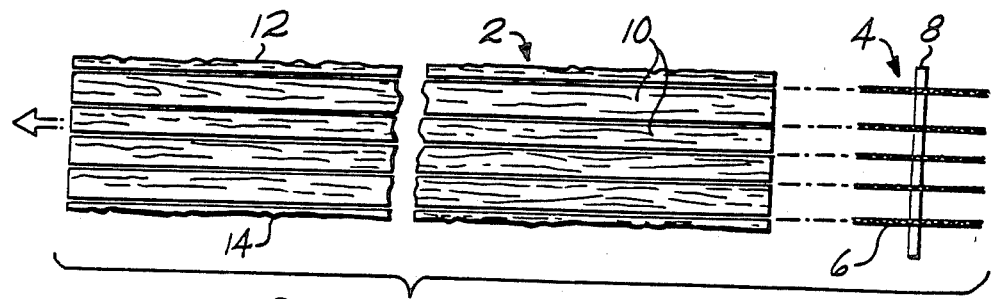
FIG. 1 illustrates a relatively straight cant which has been cut into lumber by conventional straight-line sawing.

The advantages of the present invention will be made readily apparent by reference to FIGS. 1–3. In FIG. 1, a straight cant 2 has just emerged from a circular gang saw 4. This consists of a number of identical circular saws 6 mounted on an arbor 8. To provide a point of reference, the saw to which the numeral 6 is directed should be considered as the first or "zero" saw. Cant 2 has been cut into a number of boards 10 with edge trimmings 12, 14, comprising waste taken from each edge of the cant. Note that four useful pieces of lumber 10 were obtained.

Figure 2:
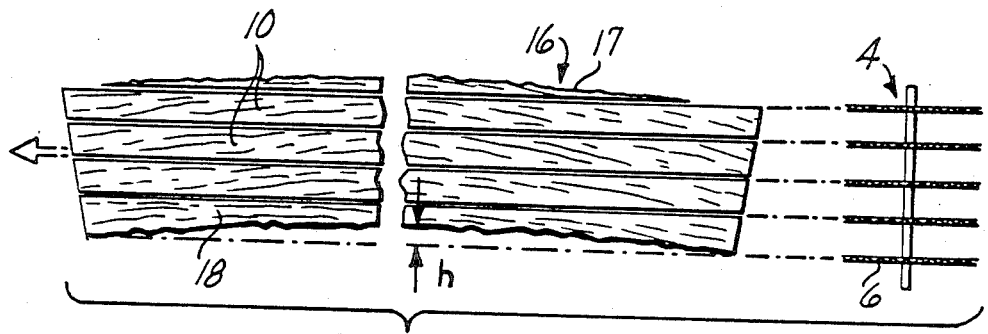
FIG. 2 represents a sweepy cant cut into lumber by straight line sawing.

In contrast, FIG. 2 shows a sweepy cant 16 which has just been processed in a similar manner through the same set of gang saws 4. Cants 2 and cants 16 are of similar surface area. Here edge trimmings 17, 18 were removed but only three useful pieces of lumber 10 were obtained.

Figure 3:
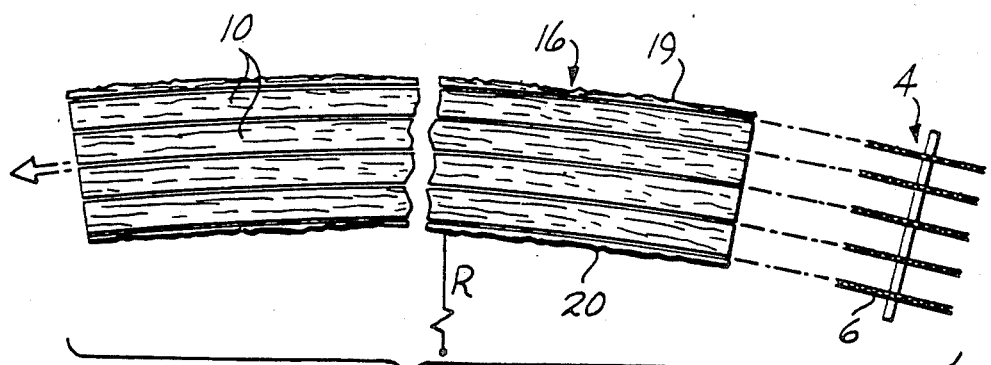
FIG. 3 illustrates a similar sweepy cant cut into lumber by sawing around the curve.

FIG. 3 shows cant 16 as it could be sawed around the curve. In this case, the cant is presented to the saws along a circular path with a radius R. Edge trimmings 19 and 20 generally follow concentric lines parallel to the respective adjacent surfaces. Here, the difference is that four usable pieces of lumber 10 were again obtained. While these are somewhat bowed as they leave the saw, experience has shown that they will normally flatten into a straight configuration during subsequent sawmilling operations, especially when kiln dried.

Figure 4:
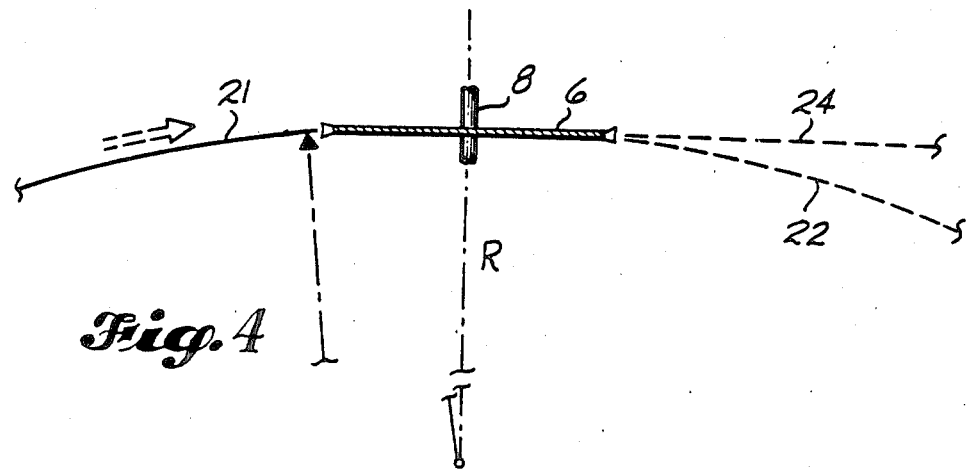
FIG. 4 illustrates the path of a given point on an incoming cant as it approaches and leaves a circular saw during around-the-curve sawing.
Figure 5:
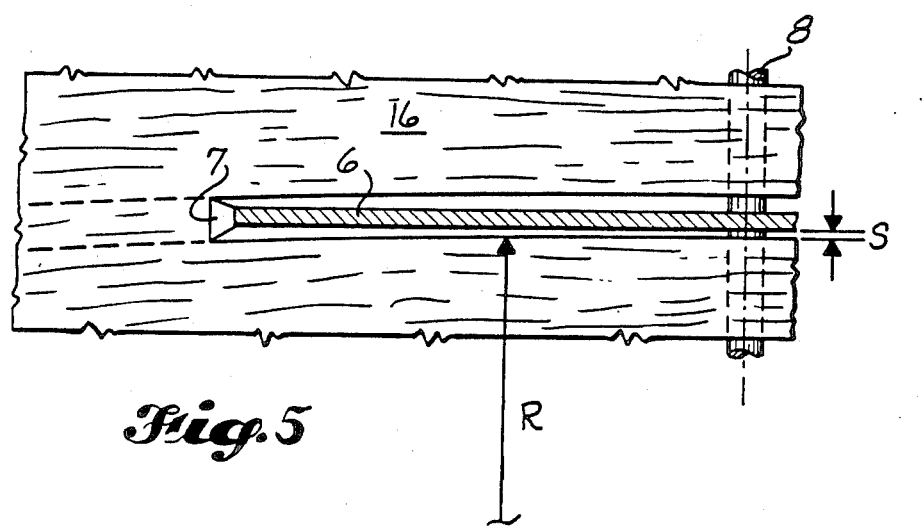
FIGS. 5 and 5A illustrate the relationship of saw side clearance to the present invention.
Figure 5A:
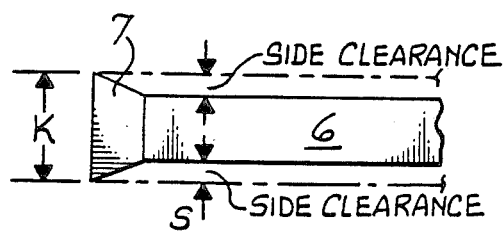

FIGS. 4–5A illustrate one of the limitations to the minimum radius of curvature of sawing. This is in general determined by the available side clearance of the saw. FIG. 4 shows the path of a point on a cant moving into the saw along a circular path 21. Note that this circle is tangent to saw blade 6 at the location of arbor 8. Ideally, one would expect the same point to leave the saw along a similar circular path 22. This is frequently the case when a roll-type conveyor system is used. However, as the lumber leaves the saw, it attains a considerable degree of flexibility not present in the cant entering the saw and it is free to deviate from the "ideal" path 22. In fact, when a slat bed conveyor is used, the exiting lumber will normally assume a nearly straight line path as shown at 24. As a practical consideration, lumber can be sawn with somewhat more sweep than side clearances would seem to dictate. Some saw plate rubbing does not seem detrimental.

FIG. 5A shows a typical circular saw construction in which the saw plate 6 has swaged or inserted cutting elements 7. These elements describe a path wider than the saw plate itself and cut a kerf K with remaining side clearance s required to prevent frictional rubbing between the material being cut and the side of the saw plate. The permissible radius of curvature R is that as shown in FIG. 5 which will not result in rubbing of cant 16 against the side of the saw plate. It is desirable that some minimum clearance should be maintained at all times.

While there is great variability, the plate thickness of circle saw gang saws will generally vary between 2.4 and 3.4 mm (0.095 to 0.135 in). Side clearance is typically in the 0.25 to 1.0 mm range (0.010 to 0.040 in), most typically about 0.4 to 0.5 mm (0.015 to 0.020 in). This is adequate side clearance to accommodate cants fed along a circular path having a radius of approximately 50 m or greater. This radius corresponds to cants having sweep of approximately 60 mm in a 5 m length or about 3 in. in 16 ft. However, a number of factors will affect the allowable curvature including cant thickness and saw configuration. Decreasing saw diameter also allows curves of shorter radius to be cut. It is believed to be entirely practical to saw around a curve having a radius as short as 30 m. This corresponds to a cant having about 100 mm sweep in 5 m of length or 4 in in 16 ft of length.

The following table shows the radius of curvature for cants of varying lengths and sweep distances, where sweep distance is the height of the arc defining the sweep. These values can be readily calculated for lengths or sweeps not shown on the table using the formula $R = (L^2 + 4h^2/8h)$ where L is the length of the cant and h is the sweep distance.

TABLE 1

Radius of Curvature in Meters vs. Sweep for Various Cant Lengths

| Length (L), m[(1)] | Sweep Distance (h), mm | | | | |
|---|---|---|---|---|---|
| | 20 | 40 | 60 | 80 | 100 |
| 2.5 | 39.1 | 19.6 | 13.1 | 9.8 | 7.8 |
| 3.5 | 76.6 | 38.3 | 25.6 | 19.2 | 15.3 |
| 5 | 156.3 | 78.2 | 52.1 | 39.1 | 31.3 |

Figure 6:
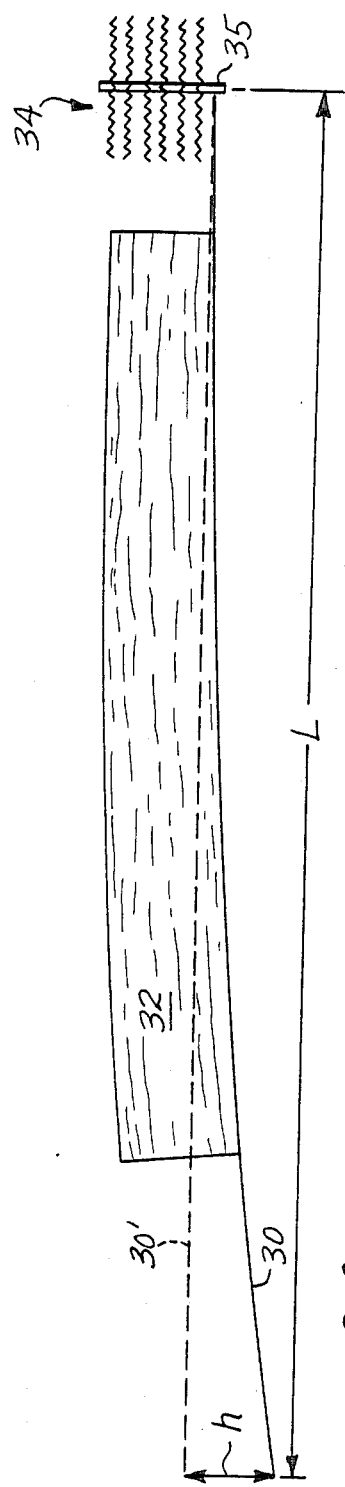
FIG. 6 illustrates a method of sawing a sweepy cant for maximum yield by bending one end of the linebar to approximate the curvature of the cant.

FIG. 6 illustrates sawing a curved cant using the linebar described in our earlier application, Ser. No. 793,925. Here the linebar 30 has been bent to a curved position from its normal straight position 30' to approximate the curvature of a sweepy cant 32. Linebar 30 has a total length of 7.3 m (24 ft). Cant 32 is 4.9 m (16 ft) with a sweep of 51 mm (2 in). The cant is being fed into a gang saw assembly 34 mounted on arbor 35. Note that a tangent to the linebar at the saw location is essentially parallel to the planes defined by the saws. In the present case it is necessary to deflect the infeed end of the linebar about 460 mm (18 in).

Figure 7:
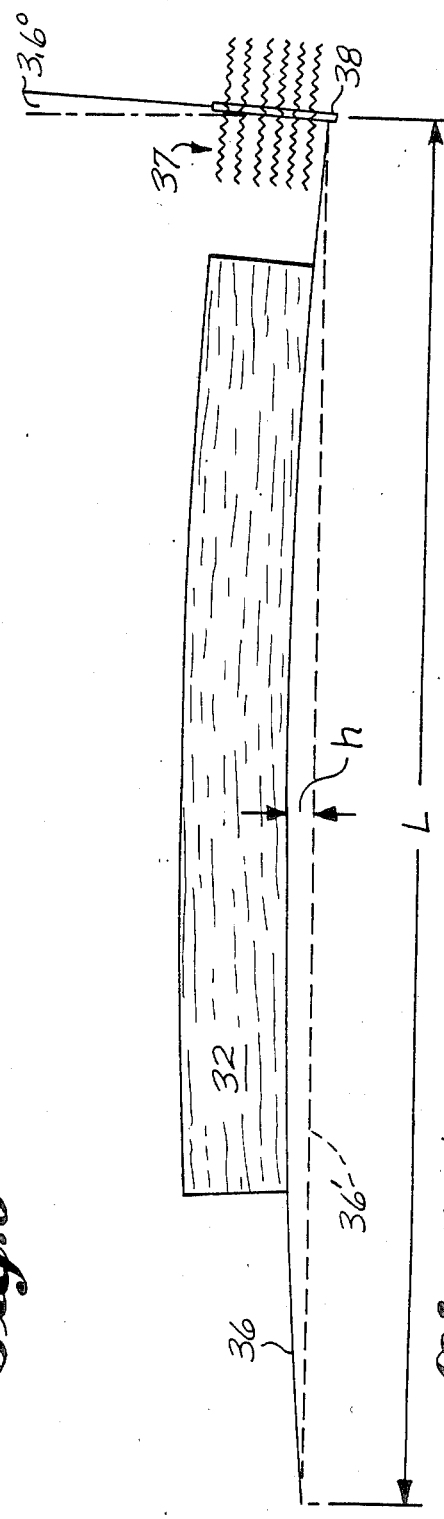
FIG. 7 illustrates the method of the present invention of sawing a sweepy cant for maximum yield by bending the linebar and skewing the saws.

FIG. 7 shows a cant and linebar of similar configurations to those shown in FIG. 6. Here only the center portion of the linebar is deflected while the ends both remain along the line defined by the linebar when it is in straight line position. However, in the present case, the saws are also skewed 3.6° to maintain parallelism of the saws with a tangent to the end of the linebar adjacent the saws. In the present case the center of the linebar need be deflected only 114 mm (4½ in). It is immediately evident that this is only one-fourth of the deflection of the linebar deflection required using the arrangement of FIG. 6. In many cases the infeed roll case to the saws is not of sufficient size, nor is space otherwise available, to accommodate a linebar having the large deflection shown in FIG. 6. This is generally not the case for an arrangement as shown in FIG. 7 where linebar deflection is relatively minor.

Figure 8:
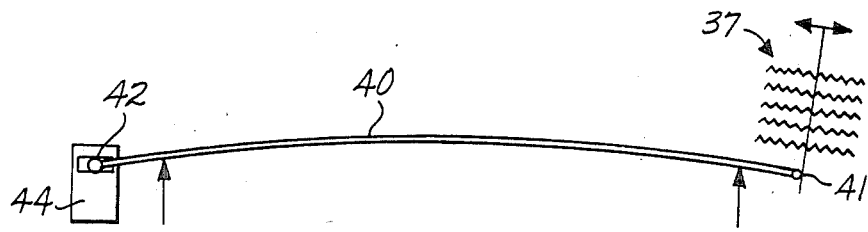
FIGS. 8 to 10A show three methods of bending linebars to assume the configuration of an arc of a circle.
Figure 9:
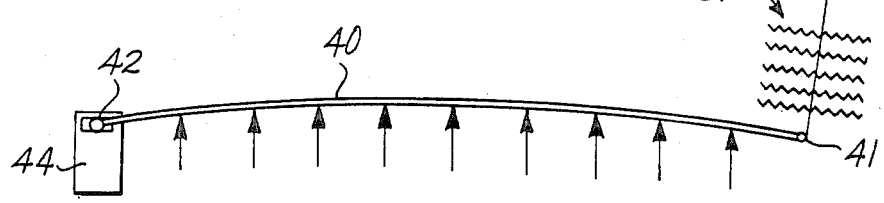
Figure 10:
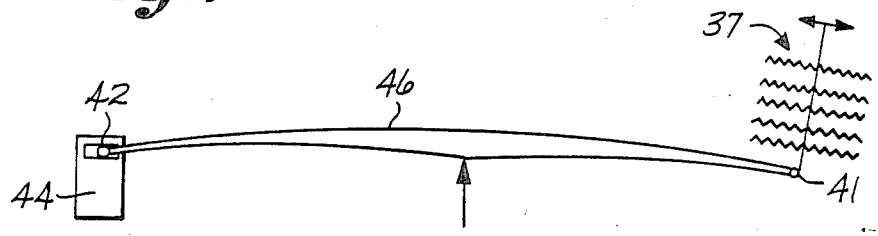

FIGS. 8 to 10 show three different ways in which linebars can be bent to assume a configuration which is generally that of an arc of a circle. The saw adjacent end of linebar 40 is permanently fixed at 41, whereas the opposite end 42 must be allowed to translate slightly to accommodate for bending. This accommodation is provided by slotted anchor block 44. In FIG. 8 linebar 40 is bent to its curved configuration by forces applied near each end. In FIG. 9 the forces are applied more uniformly along the entire length of the linebar. In both FIGS. 8 and 9 the linebar may be of uniform thickness from end to end. In FIG. 10 only a single bending force is applied at the center of linebar 46. This linebar has varying thickness, being thicker at the center and thinner at each end. Gang saws 37 can be appropriately skewed so that a projection of the longitudinal axis of the arbor is normal to a tangent to the linebar at anchor point 41.

Figure 10A:
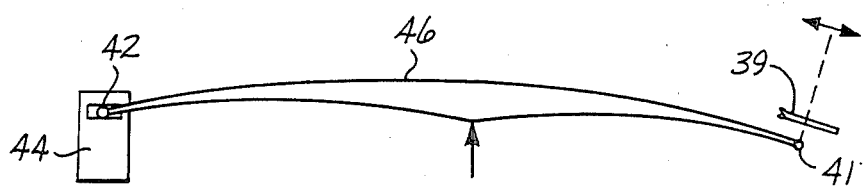

FIG. 10A is similar to FIG. 10. However, in this case instead of a circular gang saw a single skewable band saw 39 is pictured. The principles of the invention are equally applicable whether a single saw or a bank of parallel saws are used.

Figure 11:
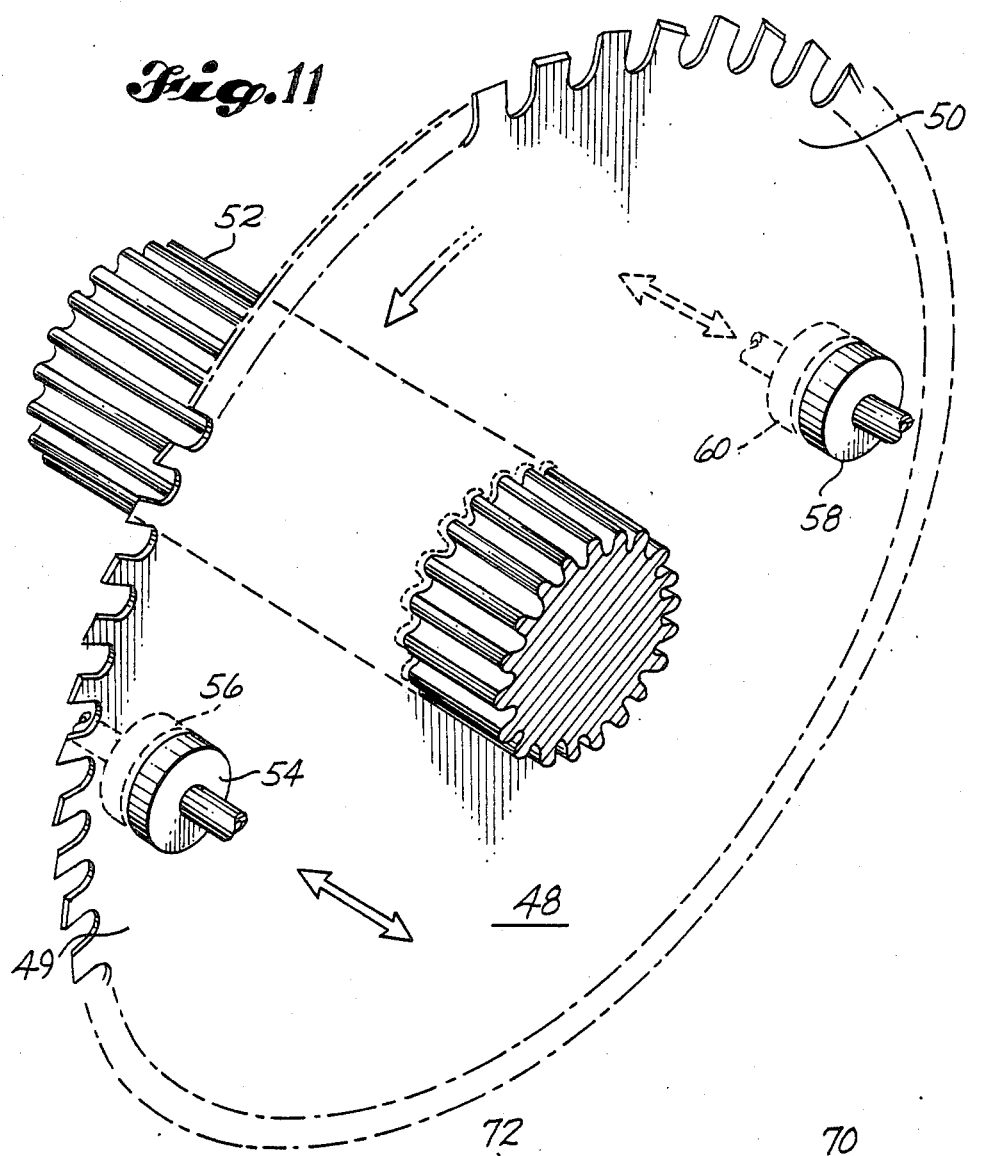
FIG. 11 illustrates a method of using a splined saw arbor that may be readily adapted for skewing saws.
Figure 12:
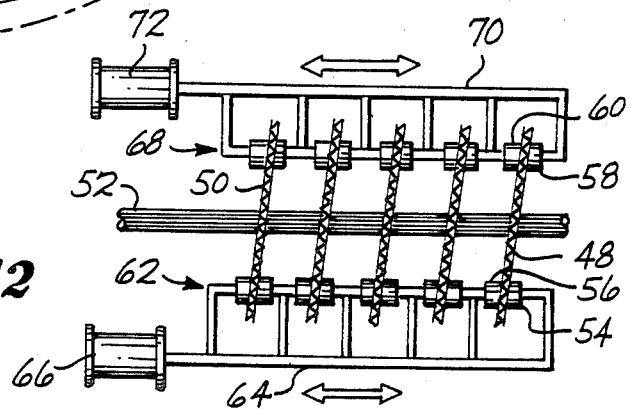
FIG. 12 illustrates one method of skewing all the saws in a circular saw gang saw, using a splined arbor.

FIGS. 11 and 12 illustrate a method of skewing saws which does not require moving the saw frame or saw arbor. In this case the saws are mounted on a Retec spline. This is described in Thrasher, U.S. Pat. No.

3,516,460. The splines are available from Retec, Inc., Ukiah, Calif., while the saws are available from several manufacturers. In this case the saws have no collar where they are mounted on the arbor and there is enough flexibility so that they can be skewed up to about 5° using only the saw guides. Here a saw of this type 48 having a leading edge 49 and trailing edge 50 is mounted on a splined arbor 52. The infeed or leading edge of the saw 49 is held between guides 54, 56 while the opposite edge is held between similar guides 58, 60. A number of different types of saw guides are available for this function. Suitable guides are described in Fairfield, Jr., et al, U.S. Pat. No. 3,674,065. Guides of this type are readily available from a number of vendors and form no part of the present invention.

FIG. 12 shows a circular gang saw using a splined arbor in which the guides are connected together to serve a saw skewing function in addition to their usual function of stabilizing the saw blade. At the infeed side of the saws the blades 48 are embraced between opposed guides 54, 56. These are in turn ganged together to form an infeed guide assembly 62 which is tied to a position control rod 64. The guide position is ultimately controlled by a fluid cylinder 66. The downstream guide assembly 68 is similarly constructed with a series of opposed saw guides 58, 60 being ganged to a position control rod 70 whose location is controlled by fluid cylinder 72.

Either one or both of the guide assemblies may be moved for skewing the saws. If only one guide assembly is moved for skewing it will normally be the rear assembly 68. In this case the front assembly 62 is in fixed position and it is not necessary to have control cylinder 66. Preferably, both guide assemblies will be movable and they will be moved in opposite directions to accomplish the required amount of skewing. Skewing can be controlled either by direct fluid or mechanical linkage to a linebar or by using electronic control, such as a programmable controller which senses linebar position and adjusts the amount of skewing accordingly.

FIGS. 13 and 14 show a similar system employing more conventional gang saws. Here the combination of skewable saw with variable curve linebar is generally shown at 78. In the present case a vertical gang saw is represented but a very similar arrangement could be employed for a horizontal gang. The saws and linebar are mounted on a base or floor member 80. In the present case the entire saw frame 82 is skewable. This is shown in combination with linebar 84. The saw frame contains a vertical gang saw 86 with saws 88, 89. Saw 89 is identical to the others but is generally designated the zero saw. The saws are mounted conventionally on an arbor 90. The entire saw assembly is held between a rear mount 92 and an equivalent front mount, not shown, on which are located trunnions 94. Linebar 84 is connected at its saw adjacent end to a subframe member 96. This in turn is connected to a pair of bell cranks 97 which control offset adjustment or distance between the linebar and zero saw. The bell cranks are pivoted at 98 to saw frame 82 and are connected at their far end to a first offset adjustment cylinder 100. At the other end of the linebar there is a clevis 102 which is pinned to one end of link 104. The other end of link 104 is pinned to a bell crank 106, similar to those adjacent to the saw. This bell crank is pivoted at 108 to an extension of main frame 80. A second offset adjustment cylinder 109 acts in concert with cylinder 100 so that linebar 84 is always moved in parallel fashion. The linebar is bent and the saws are skewed simultaneously to the action of skewing cylinder 110 which is attached to an extension 113 of saw frame 82. The opposite end of skewing cylinder 110 is anchored to the base member at extension 114. Shortening the piston rod of cylinder 110 will simultaneously cause the linebar to be bent and the saws to be skewed while maintaining the parallel relationship between the tangent at the saw adjacent end of the linebar and the plane containing the saws.

Normally it is never necessary to skew the saws more than about 5° about their point of rotation. This amount of skew can normally be readily accommodated by conventional belt drive mechanisms for the saws.

Having thus disclosed the best modes known to the inventor of practicing his invention, it will be evident to those skilled in the art that many departures can be made from the examples described without departing from the spirit of the invention. The invention is thus not to be limited to the details disclosed within the description but is to be accorded the full scope of the claims so as to embrace any and all equivalent devices, apparatus and methods.

What is claimed is:

1. In combination, a linebar and saw assembly for sawing cants or logs having varying amounts of sweep from piece to piece which comprises:

at least one saw;

an elongated flexible linebar means conformable between a straight line and a line approximating an arc of a circle, said linebar means being positioned relative to the saw so that one end is essentially adjacent to that centerline of the saw lying in the plane of the saw and normal to a projection of the longest dimension of the linebar, both ends of the linebar means always lying on the line defined by said linebar means when in straight line position, a tangent to the end of the linebar means adjacent the saw always being essentially parallel to the plane defined by saw saw;

said saw being skewable essentially about the point of intersection of the end of the linebar means adjacent the saw with a line drawn normal to the plane of the saw from said centerline;

bending means for controlling the curvature of the linebar; and skewing means for the saw, whereby said linebar means can be configured into an arc which approximates the sweep curvature of a cant or log being sawn and said saw can be skewed to maintain parallelism with the line of tangency of the linebar adjacent said saw so that a cant can be guided into the saw along a path approximating its radius of curvature.

2. The linebar and saw combination of claim 1 in which the saw is a band saw.

3. The linebar and saw combination of claim 1 in which the saw is a circular saw mounted on an arbor, said saw having a leading edge where the cant or log first contacts the saw and a trailing edge where the cant or log leaves the saw.

4. The linebar and saw combination of claim 3 in which the saw is a circular gang saw comprising a bank of spaced apart parallel circular saws mounted on the arbor, said saws having leading edges where the cant or log first contacts the saws and trailing edges where the cant or log leaves the saws.

5. The linebar and saw combination of claim 3 in which both arbor and saw are skewed.

6. The linebar and saw combination of claim 3 in which the arbor is splined and only the saw is skewed.

7. The linebar and saw combination of claim 4 in which both arbor and saws are skewed.

8. The linebar and saw combination of claim 4 in which only the saws are skewed.

9. The linebar and saw combination of claim 6 including opposed saw guide pairs adjacent the leading and trailing edges of the saw, one of said guide pairs being fixed and the other being translatable a limited distance to skew the saws.

10. The linebar and saw combination of claim 9 in which the leading edge guide pair is fixed and the trailing edge guide pair is translatable.

11. The linebar and saw combination of claim 8 including opposed saw guide pairs adjacent the leading and trailing edges of the saws, one of said guide pairs being fixed and the other being translatable a limited distance to skew the saws.

12. The linebar and saw combination of claim 11 in which the leading edge guide pair is fixed and the trailing guide pair is translatable.

13. The linebar and saw combination of claim 6 in which both guide pairs are translatable a limited ddistance in opposite directions to skew the saws.

14. The linebar and saw combination of claim 8 in which both guide pairs are translatable a limited distance in opposite directions to skew the saws.

15. The linebar and saw combination of claim 1 including translating means for moving the linebar toward or away from the saw to control the distance between them.

16. The linebar and saw combination of claim 4 including translating means for moving the linebar toward or away from the saws to control the distance between said linebar and the saw nearest the linebar.

17. A method of sawing cants or logs having varying amounts of sweep from piece to piece which comprises:
providing at least one saw;
further providing an elongated flexible linebar means conformable between a straight line and a line approximating an arc of a circle;
said linebar means being positioned relative to the saw so that one end is essentially adjacent to that centerline of the saw lying in the plane of the saw and normal to a projection of the longest dimension of the linebar,
both ends of the linebar means always lying on the line defined by said linebar means when in straight line position,
a tangent to the end of the linebar means adjacent the saw always being essentially parallel to he plane defined by said saw;
said saw being skewable essentially about the point of intersection of the end of the linebar means adjacent the saw with a line drawn normal to the plane of the saw from said centerline;
bending the linebar to conform its curvature to the sweep curvature of the cant or log; and
skewing the saw to maintain parallelism with the line of tangency of the linebar adjacent said saw so that the cant is guided into the saw along a path approximating its radius of curvature.

18. The method of claim 17 in which the saw comprises a circular saw mounted on an arbor.

19. The method of claim 18 in which the saw is a circular gang saw comprising a bank of parallel spaced apart circular saws mounted on the arbor.

20. The method of claim 19 which includes skewing both the arbor and the saws.

21. The method of claim 19 in which the arbor is splined and which includes skewing only the saws without skewing the arbor.

* * * * *